(12) United States Patent
Xue et al.

(10) Patent No.: US 10,261,715 B2
(45) Date of Patent: Apr. 16, 2019

(54) STORAGE SPACE MANAGEMENT METHOD AND APPARATUS

(71) Applicant: Huawei Technologies Co., Ltd., Shenzhen (CN)

(72) Inventors: Changliang Xue, Beijing (CN); Wenlong Huang, Shenzhen (CN); Guanyu Zhu, Shenzhen (CN); Jun Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 15/625,385

(22) Filed: Jun. 16, 2017

(65) Prior Publication Data

US 2017/0285956 A1    Oct. 5, 2017

Related U.S. Application Data

(63) Continuation of application No. PCT/CN2014/093948, filed on Dec. 16, 2014.

(51) Int. Cl.
*G06F 3/06* (2006.01)
*G06F 17/30* (2006.01)

(52) U.S. Cl.
CPC ............ *G06F 3/064* (2013.01); *G06F 3/0616* (2013.01); *G06F 3/0679* (2013.01); *G06F 17/30* (2013.01);
(Continued)

(58) Field of Classification Search
CPC ...... G06F 3/064; G06F 3/0679; G06F 3/0616; G06F 17/30247; G06F 17/30; G06F 3/0608; Y02D 10/45
See application file for complete search history.

(56) References Cited

U.S. PATENT DOCUMENTS 9,305,647 B2 *  4/2016  Li ..................... G11C 13/003
9,367,567 B2 *  6/2016  Matsumoto .......... G06K 9/4642
(Continued)

FOREIGN PATENT DOCUMENTS

CN    101183337 A    5/2008
CN    101854341 A    10/2010
(Continued)

OTHER PUBLICATIONS

Machine Translation and Abstract of Chinese Publication No. CN101854341, Oct. 6, 2010, 11 pages.
(Continued)

*Primary Examiner* — Rocio Del Mar Perez-Velez
(74) *Attorney, Agent, or Firm* — Conley Rose, P.C.

(57) ABSTRACT

A storage space management method and apparatus, where the method and apparatus are applied to a non-volatile memory (NVM). In a feature set that includes M image features of M idle blocks in storage space of the NVM, an idle block whose image feature is highly similar to an image feature of data to be written into the NVM is determined such that the data is written into the idle block. In this way, wear and energy consumption problems are considered during storage space allocation, and a write operation of an idle block in storage space of an NVM can consume less energy, thereby extending a life span of the NVM and reducing write operation energy consumption.

14 Claims, 8 Drawing Sheets

(52) U.S. Cl.
CPC ........ *G06F 17/30247* (2013.01); *Y02D 10/45* (2018.01)

(56) References Cited

U.S. PATENT DOCUMENTS

| | | | | |
|---|---|---|---|---|
| 9,501,421 | B1* | 11/2016 | Cheriton | G06F 12/10 |
| 9,626,553 | B2* | 4/2017 | Sato | G06F 17/30259 |
| 2008/0288436 | A1* | 11/2008 | Priya | G06F 12/0246 |
| | | | | 706/48 |
| 2009/0089485 | A1 | 4/2009 | Yeh | |
| 2012/0131240 | A1 | 5/2012 | Aronovich et al. | |
| 2014/0016397 | A1* | 1/2014 | Lee | G11C 13/0069 |
| | | | | 365/148 |
| 2015/0178193 | A1* | 6/2015 | Song | G11C 16/349 |
| | | | | 711/103 |

FOREIGN PATENT DOCUMENTS

| | | |
|---|---|---|
| CN | 103930890 A | 7/2014 |
| EP | 2757479 A1 | 7/2014 |

OTHER PUBLICATIONS

Machine Translation and Abstract of Chinese Publication No. CN103930890, Jul. 16, 2014, 23 pages.
Li, J., et al. ,"A content-aware writing mechanism for reducing energy on non-volatile memory based embedded storage systems", XP035461213, Design Automation for Embed System, vol. 17, No. 3-4, Sep. 2013, pp. 711-737.
Foreign Communication From A Counterpart Application, European Application No. 14908138.2, Extended European Search Report dated Aug. 2, 2017, 8 pages.
Foreign Communication From A Counterpart Application, PCT Application No. PCT/CN2014/093948, English Translation of International Search Report dated Jul. 2, 2015, 2 pages.
Foreign Communication From A Counterpart Application, PCT Application No. PCT/CN2014/093948, English Translation of Written Opinion dated Jul. 2, 2015, 11 pages.
Machine Translation and Abstract of Chinese Publication No. CN101183337, May 21, 2008, 9 pages.
Foreign Communication From A Counterpart Application, Chinese Application No. 201480045225.7, Chinese Office Action dated Aug. 29, 2018, 6 pages.

* cited by examiner

STORAGE SPACE MANAGEMENT METHOD AND APPARATUS

CROSS-REFERENCE TO RELATED APPLICATION

This application is a continuation of International Patent Application No. PCT/CN2014/093948 filed on Dec. 16, 2014, which is hereby incorporated by reference in its entirety.

TECHNICAL FIELD

Embodiments of the present disclosure relate to the information storage technologies, and in particular, to a storage space management method and apparatus.

BACKGROUND

In recent years, in order to meet a performance requirement of an application, a non-volatile memory (NVM) based on a new material and a new mechanism continuously achieves new breakthroughs, and gradually develops towards a mature industrialization direction.

The NVM and a dynamic random access memory (DRAM) have similar capabilities such as read/write performance, byte addressing, and bit-by-bit overwriting. Moreover, the NVM further has a greater storage density and capacity, and a characteristic that data is not lost during a power failure. However, some NVMs still have problems of a short life span and high wear, that is, frequent write operations cause damage of a physical block in the NVM, thereby invalidating the NVM. In addition, the write operations in the NVM also consume excessively large energy.

SUMMARY

Embodiments of the present disclosure provide a storage space management method and apparatus to extend a life span of an NVM and reduce write operation energy consumption.

According to a first aspect, an embodiment of the present disclosure provides a storage space management method, where the method is applied to an NVM and includes obtaining an image feature of data to be written into the NVM, determining, in a feature set of storage space of the NVM, a first image feature that is most similar to the image feature of the data, where M image features obtained according to M idle blocks in the storage space of the NVM are included in the feature set, a size of each idle block in the storage space is the same as a size of the data, the M idle blocks include an invalid data block and an area in which no data is written in the storage space of the NVM, and M is a natural number, and writing the data into an idle block having the first image feature.

According to the first aspect, in a first possible implementation manner of the first aspect, before determining, in a feature set of storage space of the NVM, a first image feature that is most similar to the image feature of the data, the method further includes calculating an image feature of each of the M idle blocks in the storage space of the NVM.

According to the first possible implementation manner of the first aspect, in a second possible implementation manner of the first aspect, calculating an image feature of each of the M idle blocks in the storage space of the NVM includes traversing an idle block i in the storage space of the NVM using a preset window, and obtaining a local binary pattern (LBP) eigenvector $X_i$ of the idle block i, where $X_i=(LBP_{i1}, LBP_{i2}, \ldots, LBP_{iN})$, N is determined according to a size of the idle block i and a size of the preset window, $LBP_{in}$ is an LBP operator corresponding to each preset window in the idle block i, $$LBP_{in} = \sum_{j=0}^{J-1} s_j 2^j,$$

J indicates a total quantity of bits obtained after the LBP operator is converted into binary, and $s_j=0$ or 1, and obtaining an image feature $T_i$ of the idle block i according to the LBP eigenvector $X_i$ of the idle block i and a ratio $P_i$ of 0 to 1 in the idle block i, where $T_i=\alpha X_i+\beta P_i$, $\alpha$ and $\beta$ indicate weights, and $\alpha+\beta=1$.

According to the second possible implementation manner of the first aspect, in a third possible implementation manner of the first aspect, obtaining an image feature of data to be written into the NVM includes traversing the data using the preset window, and obtaining an LBP eigenvector X of the data, where $X=(LBP_1, LBP_2, \ldots, LBP_N)$ and $$LBP_n = \sum_{j=0}^{J-1} s_j 2^j,$$

and obtaining an image feature T of the data according to the LBP eigenvector X of the data and a ratio P of 0 to 1 in the data, where $T=\alpha X+\beta P$.

According to the third possible implementation manner of the first aspect, in a fourth possible implementation manner of the first aspect, the feature set includes multiple B+ trees, nodes of the multiple B+ trees include the M image features of the M idle blocks in the storage space of the NVM, and determining, in a feature set of storage space of the NVM, a first image feature that is most similar to the image feature of the data includes determining a first B+ tree according to an Euclidean distance from the image feature of the data to a root node of each B+ tree in the multiple B+ trees, where the first B+ tree is a B+ tree with a shortest Euclidean distance in the Euclidean distances from the root node of each of all the B+ trees to the image feature of the data, calculating an Euclidean distance between the image feature of the data and each node in the first B+ tree, and determining that a first image feature with a shortest Euclidean distance that is in the Euclidean distances between the image feature of the data and all nodes in the first B+ tree is the first image feature that is most similar to the image feature of the data.

According to any one of the first aspect, or the first to the fourth possible implementation manners of the first aspect, in a fifth possible implementation manner of the first aspect, after writing the data into an idle block having the first image feature, the method further includes marking a status of the idle block having the first image feature as 'used'.

According to any one of the first aspect, or the first to the fifth possible implementation manners of the first aspect, in a sixth possible implementation manner of the first aspect, the method further includes obtaining an image feature of the recycled invalid data block when the invalid data block in the storage space of the NVM is recycled, where the invalid data block is a data block in which stored data is in an invalid state in the storage space of the NVM, and updating the feature set of the storage space of the NVM according to the image feature of the invalid data block.

According to a second aspect, an embodiment of the present disclosure provides a storage space management apparatus, where the apparatus is applied to an NVM and includes an obtaining module configured to obtain an image feature of data to be written into the NVM, a determining module configured to determine, in a feature set of storage space of the NVM, a first image feature that is most similar to the image feature, obtained by the obtaining module, of the data, where M image features obtained according to M idle blocks in the storage space of the NVM are included in the feature set, a size of each idle block in the storage space is the same as a size of the data, the M idle blocks include an invalid data block and an area in which no data is written in the storage space of the NVM, and M is a natural number, and a management module configured to write the data into an idle block having the first image feature determined by the determining module.

According to the second aspect, in a first possible implementation manner of the second aspect, the obtaining module is further configured to calculate an image feature of each of the M idle blocks in the storage space of the NVM.

According to the first possible implementation manner of the second aspect, in a second possible implementation manner of the second aspect, that the obtaining module is configured to calculate an image feature of each of the M idle blocks in the storage space of the NVM includes traversing an idle block i in the storage space of the NVM using a preset window, and obtaining an LBP eigenvector $X_i$ of the idle block i, where $X_i=(LBP_{i1}, LBP_{i2}, \ldots, LBP_{iN})$, N is determined according to a size of the idle block i and a size of the preset window, $LBP_{in}$ is an LBP operator corresponding to each preset window in the idle block i, $$LBP_{in} = \sum_{j=0}^{J-1} s_j 2^j,$$

J indicates a total quantity of bits obtained after the LBP operator is converted into binary, and $s_j=0$ or 1 and obtaining an image feature $T_i$ of the idle block i according to the LBP eigenvector $X_i$ of the idle block i and a ratio $P_i$ of 0 to 1 in the idle block i, where $T_i=\alpha X_i+\beta P_i$, $\alpha$ and $\beta$ indicate weights, and $\alpha+\beta=1$.

According to the second possible implementation manner of the second aspect, in a third possible implementation manner of the second aspect, that the obtaining module is configured to obtain an image feature of data to be written into the NVM includes traversing the data using the preset window, and obtaining an LBP eigenvector X of the data, where $X=(LBP_1, LBP_2, \ldots, LBP_N)$, and $$LBP_n = \sum_{j=0}^{J-1} s_j 2^j,$$

and obtaining an image feature T of the data according to the LBP eigenvector X of the data and a ratio P of 0 to 1 in the data, where $T=\alpha X+\beta P$.

According to the third possible implementation manner of the second aspect, in a fourth possible implementation manner of the second aspect, the feature set includes multiple B+ trees, nodes of the multiple B+ trees include the M image features of the M idle blocks in the storage space of the NVM, and the determining module is further configured to determine a first B+ tree according to an Euclidean distance from the image feature of the data to a root node of each B+ tree in the multiple B+ trees, where the first B+ tree is a B+ tree with a shortest Euclidean distance in the Euclidean distances from the root node of each of all the B+ trees to the image feature of the data, calculate an Euclidean distance between the image feature of the data and each node in the first B+ tree, and determine that a first image feature with a shortest Euclidean distance that is in the Euclidean distances between the image feature of the data and all nodes in the first B+ tree is the first image feature that is most similar to the image feature of the data.

According to any one of the second aspect, or the first to the fourth possible implementation manners of the second aspect, in a fifth possible implementation manner of the second aspect, the management module is further configured to mark a status of the idle block having the first image feature as 'used' after the data is written into the idle block having the first image feature.

According to any one of the second aspect, or the first to the fifth possible implementation manners of the second aspect, in a sixth possible implementation manner of the second aspect, the management module is further configured to recycle the invalid data block in the storage space of the NVM, and the obtaining module is further configured to, when the management module recycles the invalid data block in the storage space of the NVM, obtain an image feature of the recycled invalid data block, where the invalid data block is a data block in which stored data is in an invalid state in the storage space of the NVM, and update the feature set of the storage space of the NVM according to the image feature of the invalid data block.

According to the embodiments of the present disclosure, in a feature set that includes an image feature of an idle block in storage space of an NVM, an idle block whose image feature is highly similar to an image feature of data to be written into the NVM is determined such that the data is written into the idle block. In this way, wear and energy consumption problems are considered during storage space allocation, and a write operation of an idle block in storage space of an NVM can consume less energy, thereby extending a life span of the NVM and reducing write operation energy consumption.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description are merely accompanying drawings of some embodiments of the present disclosure.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

A currently researched NVM mainly includes a phase change memory (PCM), a resistive random access memory (RRAM), a magnetic random access memory (MRAM), and the like.

In the other approaches, for allocation and management of storage medium space, there are a space management and allocation method based on a bitmap or a linked list, and a PCM periodic wear leveling method and memory management method. According to the space management and allocation method based on the bitmap or the linked list, in an NVM space management and allocation process, an extra method is required to reduce wear and energy consumption of an NVM medium. According to the PCM periodic wear leveling method and memory management method, in an NVM space management and allocation process, wear reduction of an NVM medium is considered, but an energy consumption problem is not considered. Therefore, according to the embodiments of the present disclosure, in an NVM storage space allocation and management process, wear and excessive write energy consumption problems happened when an NVM is applied to a storage system are resolved.

The embodiments of the present disclosure target improvement and innovation of NVM storage space allocation and management of a file system facing an NVM in the future. According to the embodiments of the present disclosure, in a feature set that includes an image feature of an idle block in storage space of an NVM, an idle block whose image feature is highly similar to an image feature of data to be written into the NVM is determined such that the data is written into the idle block. In this way, wear and energy consumption problems are considered during storage space allocation, and a write operation of an idle block in storage space of an NVM can consume less energy, thereby extending a life span of the NVM and reducing write operation energy consumption.

Exemplary application scenarios of the embodiments of the present disclosure are described in the following.

In an application scenario of the embodiments of the present disclosure, an NVM is used as an external storage. The application scenario includes a host, a memory, an NVM of multiple channels, and an NVM controller. A central processing unit (CPU) of the host reads and writes data in the NVM using the NVM controller.

Figure 1:
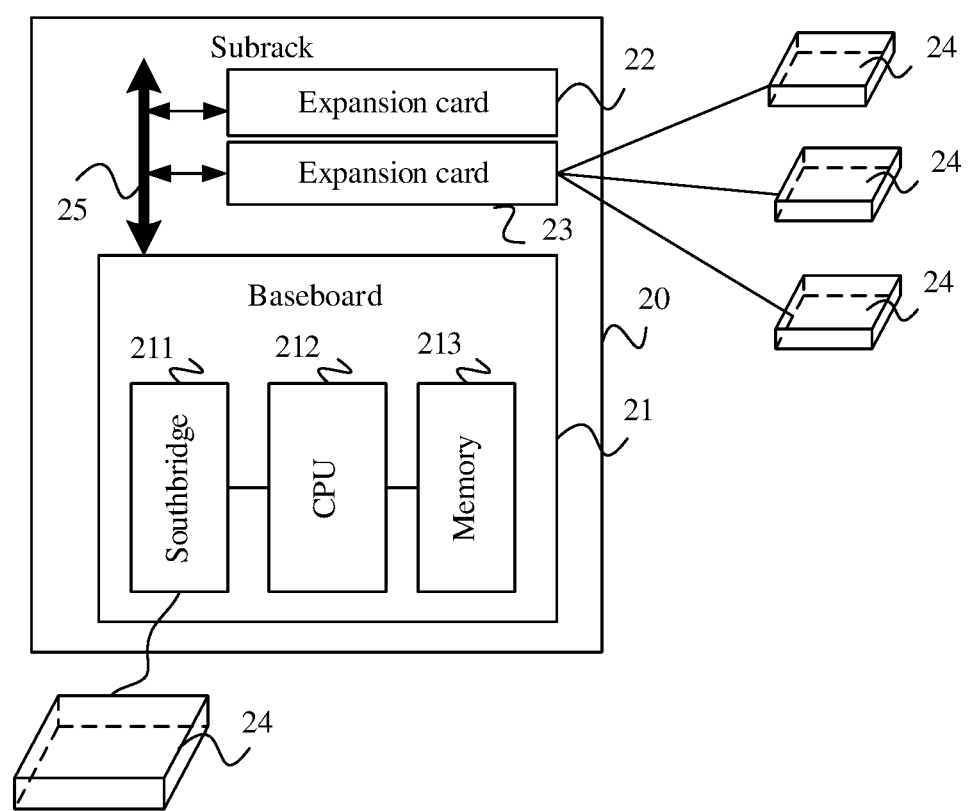
FIG. 1 is an exemplary diagram of an application scenario according to an embodiment of the present disclosure.

For example, as shown in FIG. 1, a baseboard 21 is included in a subrack 20 of a single host or server, and chips such as a southbridge 211, a CPU 212, and a memory 213 are installed on the baseboard 21 and are configured to control another expansion card (such as an expansion card 22 and an expansion card 23 shown in FIG. 1) in order to implement functions of the host. The NVM controller (not shown in FIG. 1) is also a chip such as a field-programmable gate array (FPGA) and an application specific integrated circuit (ASIC). The NVM controller is programmed to receive a read/write request of the host and perform various types of access to and control on the NVM. NVMs and a chip corresponding to the NVM controller may be disposed on a printed circuit board (PCB) and connected to each other using PCB cabling, and are finally presented in a form of an NVM device box, that is, an NVM device box 24 shown in FIG. 1. Alternatively, an NVM chip (not shown) and the NVM controller may be made into the expansion card 22, 23, and the expansion card 22, 23 is connected to the baseboard 21 using a bus and a standard interface, for example peripheral component interface express(PCIe) interface 25.

In another application scenario of the embodiments of the present disclosure, an NVM is directly mounted to a memory bus. The application scenario includes a host, a memory, an NVM of multiple channels, and an NVM controller. A CPU of the host reads and writes data in the NVM using the NVM controller.

Figure 2:
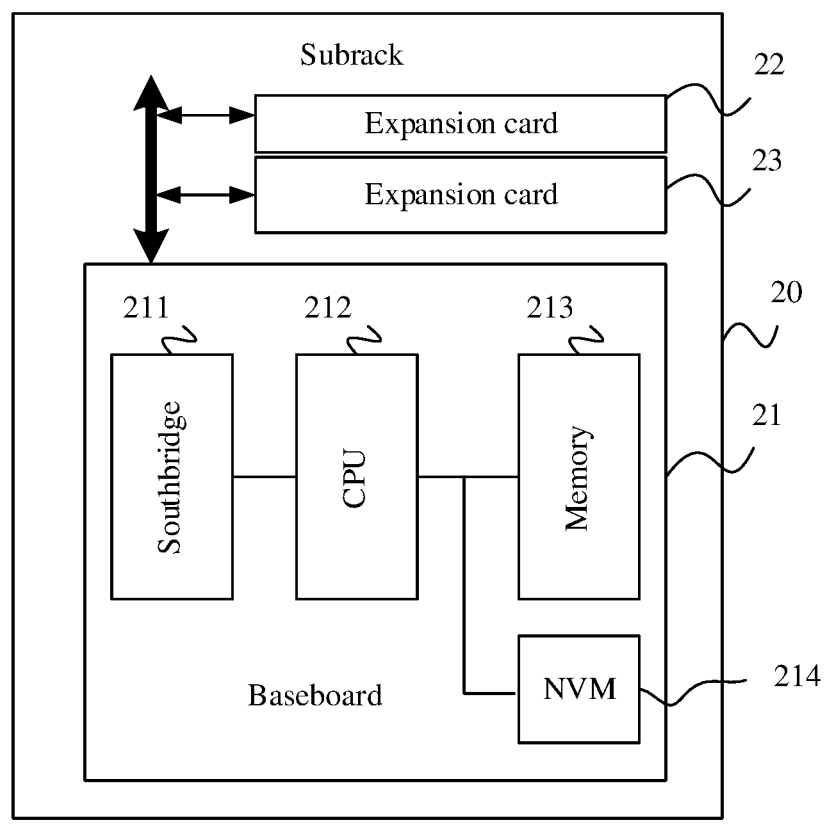
FIG. 2 is an exemplary diagram of another application scenario according to an embodiment of the present disclosure.

For example, as shown in FIG. 2, a baseboard 21 is included in a subrack 20 of a single host or server, and chips such as a southbridge 211, a CPU 212, and a memory 213 are installed on the baseboard 21 and are configured to control another expansion card, such as an expansion card 22 and an expansion card 23 to implement functions of the host. The NVM controller (not shown in FIG. 2) is also a chip such as an FPGA and an ASIC. The NVM controller is programmed to receive a read/write request of the host and perform various types of access to and control on an NVM 214. NVMs and a chip corresponding to the NVM controller may be disposed on a PCB and connected to each other using PCB cabling, and are finally presented in a form of an NVM dual in-line memory module (DIMM), that is, the NVM 214 shown in FIG. 2. The NVM 214 is connected to the CPU 212 using the memory bus.

Figure 3:
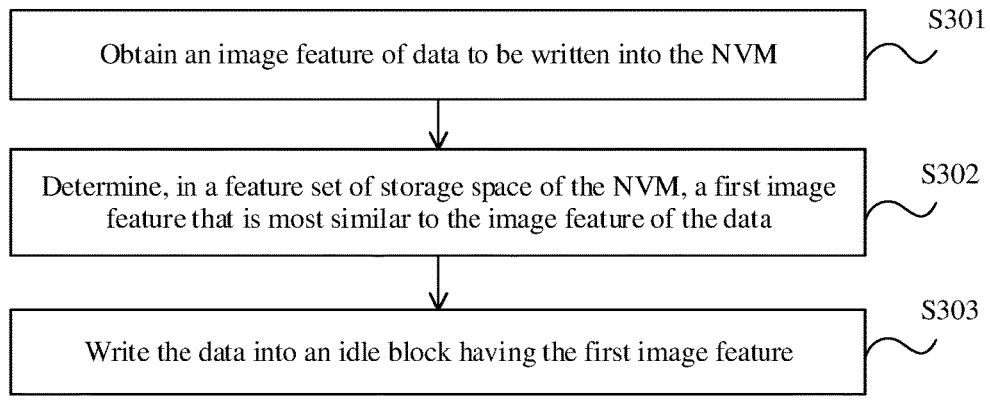
FIG. 3 is a schematic flowchart of a storage space management method according to an embodiment of the present disclosure.

FIG. 3 is a schematic flowchart of a storage space management method according to an embodiment of the present disclosure. This embodiment of the present disclosure provides a storage space management method, and the method is applied to an NVM. The NVM in this embodiment of the present disclosure is capable of byte addressing and writing data into an NVMmedium in a unit of a bit. The method may be executed by a storage space management apparatus. The apparatus may be independently disposed, or may be integrated into a communications device, and the communications device may be any terminal device such as a desktop computer, a notebook computer, or a server. As shown in FIG. 3, the method includes the following steps.

Step S301: Obtain an image feature of data to be written into the NVM.

Further, each data that is filled with '0' and/or '1' and that is to be written into the NVM may be considered as a monochrome image. Therefore, the image feature of the data to be written into the NVM can be extracted.

The data to be written into the NVM may be the original to-be-written data, or may be data obtained after the original to-be-written data is divided, or may be data obtained after the original to-be-written data is zero-filled, which is not limited in the present disclosure.

Step S302: Determine, in a feature set of storage space of the NVM, a first image feature that is most similar to the image feature of the data.

M image features obtained according to M idle blocks in the storage space of the NVM are included in the feature set. A size of each idle block in the storage space is the same as a size of the data. The M idle blocks may include an invalid data block and an area in which no data is written in the storage space of the NVM, and M is a natural number. The first image feature is one of the M image features obtained according to the M idle blocks in the storage space of the NVM.

Because the image features of all the idle blocks in the storage space are included in the feature set of the storage space of the NVM, an idle block whose image feature is most similar to the image feature of the data may be determined by querying the feature set of the storage space. A structure of the feature set of the storage space is not limited in this embodiment of the present disclosure.

Step S303: Write the data into an idle block having the first image feature.

Because the NVM in this embodiment of the present disclosure is capable of byte addressing and writing data into an NVM medium in a unit of a bit, the data and the idle block having the first image feature are compared bit by bit, and in the comparison process, only bits of different values need to be overwritten.

According to the embodiments of the present disclosure, in a feature set that includes an image feature of an idle block in storage space of an NVM, an idle block whose image feature is highly similar to an image feature of data to be written into the NVM is determined such that the data is written into the idle block. In this way, wear and energy consumption problems are considered during storage space allocation, and a write operation of an idle block in storage space of an NVM can consume less energy, thereby extending a life span of the NVM and reducing write operation energy consumption.

Based on the foregoing description, before the step S302, the method may further include calculating an image feature of each of the M idle blocks in the storage space of the NVM.

Further, the NVM includes a physical block, and the physical block includes an idle block. Allocation and management of the storage space of the NVM is allocation and management of the physical block of the NVM. In this embodiment, image features of all physical blocks in the NVM may be extracted, or an image feature of only an idle block may be extracted. However, all image features of one physical block are considered as a whole.

The foregoing embodiment is explained in the following specific implementation manner.

In an implementation manner, calculating an image feature of each of the M idle blocks in the storage space of the NVM may include traversing an idle block i in the storage space of the NVM using a preset window, and obtaining an LBP eigenvector $X_i$ of the idle block i, where $X_i=(LBP_{i1}, LBP_{i2}, \ldots, LBP_{iN})$, N is determined according to a size of the idle block i and a size of the preset window, $LBP_{in}$ is an LBP operator corresponding to each preset window in the idle block i, $$LBP_{in} = \sum_{j=0}^{J-1} s_j 2^j,$$

J indicates a total quantity of bits obtained after the LBP operator is converted into binary, and $s_j=0$ or 1, and obtaining an image feature $T_i$ of the idle block i according to the LBP eigenvector $X_i$ of the idle block i and a ratio $P_i$ of 0 to 1 in the idle block i, where $T_i=\alpha X_i+\beta P_i$, $\alpha$ and $\beta$ indicate weights, and $\alpha+\beta=1$. Further, $P_i$ indicates a ratio of a quantity of '0' bits to a quantity of '1' bits in the idle block. $\alpha$ and $\beta$ meet a constraint condition $\alpha+\beta=1$, and are between 0 and 1.

Figure 4:
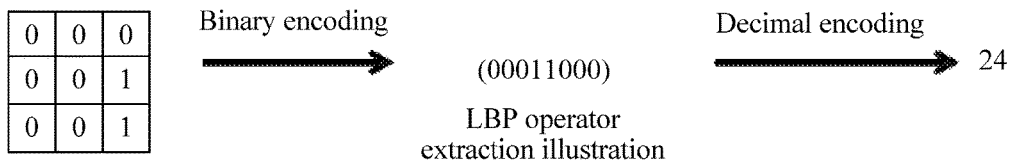
FIG. 4 is an exemplary diagram of LBP operator extraction in another storage space management method according to an embodiment of the present disclosure.

The LBP operator is a conventional feature extraction operator with higher efficiency and faster operation speed. For example, as shown in FIG. 4, an 8-bit binary number generated by clockwise sorting eight points around a central point in a preset 3×3 window is converted into a decimal number to obtain a code, and the code is referred to as an LBP operator code, that is, $$LBP_{in} = \sum_{j=0}^{J-1} s_j 2^j.$$

In addition, because there is an extremely strong correlation between the LBP eigenvector and distribution of '0' and/or '1', in this embodiment of the present disclosure, a percentage of '0' to '1', that is, $P_i$, is added into a description of the image feature of the idle block, and $P_i$ indicates the ratio of '0' to '1' in the idle block i.

Therefore, image features corresponding to all idle blocks in the storage space are extracted according to the foregoing method in order to obtain a feature set including the image features of all the idle blocks. For example, the feature set is shown as follows:

$$\begin{bmatrix} (\alpha \cdot LBP_{11}, \alpha \cdot LBP_{12}, \ldots, \alpha \cdot LBP_{1N}, \beta P_1) \\ (\alpha \cdot LBP_{21}, \alpha \cdot LBP_{22}, \ldots, \alpha \cdot LBP_{2N}, \beta P_2) \\ (\alpha \cdot LBP_{31}, \alpha \cdot LBP_{32}, \ldots, \alpha \cdot LBP_{3N}, \beta P_3) \\ \vdots \\ \vdots \\ (\alpha \cdot LBP_{M1}, \alpha \cdot LBP_{M2}, \ldots, \alpha \cdot LBP_{MN}, \beta P_M) \end{bmatrix},$$

where $T_i=\alpha X_i+\beta P_i=(\alpha \cdot LBP_{i1}, \alpha \cdot LBP_{i2}, \ldots, \alpha \cdot LBP_{iN}, \beta P_i)$.

Based on the foregoing description, the step S301 may include traversing the data using the preset window, obtaining an LBP eigenvector X of the data, where $X=(LBP_1, LBP_2, \ldots, LBP_N)$, and $$LBP_n = \sum_{j=0}^{J-1} s_j 2^j,$$

and obtaining an image feature T of the data according to the LBP eigenvector X of the data and a ratio P of 0 to 1 in the data, where $T=\alpha X+\beta P$. Further, P indicates a ratio of a quantity of '0' bits to a quantity of '1' bits in the data to be written into the NVM.

A feature set type and quantity may be limited according to an actual requirement. An example is used for description in the following.

In an implementation manner, a B+ tree is directly built based on the image features of all the idle blocks.

In another implementation manner, creating the feature set of the storage space of the NVM on the basis of the image features of all the idle blocks may include clustering the image features of all the idle blocks in the NVM using a K-means clustering algorithm in order to form K classes, where central points of the K classes are indicated by $P_k$, k=1, 2 . . . , K, and the image feature of each idle block is considered as a whole during clustering, calculating an Euclidean distance between the image feature of each idle block in each class and a reference point, where the central point of each class is used as the reference point, and building a B+ tree according to the Euclidean distances. In this implementation manner, a quantity of B+ trees is K. Relative to the previous implementation manner, this implementation manner has higher efficiency and stronger pertinence in determining the first image feature that is most similar to the image feature of the data.

In a specific embodiment, the feature set may include multiple B+ trees (not limited to K), and nodes of the multiple B+ trees include the M image features of the idle blocks in the storage space of the NVM. In this embodiment, the step S302 may include determining a first B+ tree according to an Euclidean distance from the image feature of the data to a root node of each B+ tree in the multiple B+ trees, where the first B+ tree is a B+ tree with a shortest Euclidean distance in the Euclidean distances from the root node of each of all the B+ trees to the image feature of the data, calculating an Euclidean distance between the image feature of the data and each node in the first B+ tree, and determining that a first image feature with a shortest Euclidean distance that is in the Euclidean distances between the image feature of the data and all nodes in the first B+ tree is the first image feature that is most similar to the image feature of the data.

Figure 5:
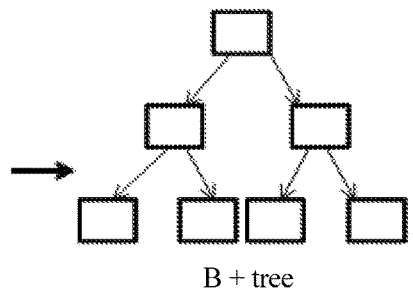
FIG. 5 is an exemplary diagram of a B+ tree index in another storage space management method according to an embodiment of the present disclosure.

For example, as shown in FIG. 5, an image feature of data to be written into an NVM is extracted. An Euclidean distance between the image feature of the data to be written into the NVM and a root node of each B+ tree is calculated in each B+ tree, and the image feature of the data to be written into the NVM is compared, according to the Euclidean distances, to a first B+ tree with the shortest Euclidean distance in order to search for a similar image feature. Then, in the first B+ tree, an idle block whose image feature is most similar to the image feature of the data to be written into the NVM is determined by calculating an Euclidean distance between the image feature of the data to be written into the NVM and each node. Parts marked as '1' indicate image features that can be extracted from this idle block, and are indicated as a contour feature such that the contour feature is used to indicate the idle block. Only an example shown in FIG. 5 is used herein to explain that the idle block is indicated using the image feature, which is not limited by the present disclosure.

Based on the foregoing embodiment, after the step S303, the method may further include marking a status of the idle block having the first image feature as 'used'. Therefore, when an idle block is being allocated to other data to be written into the NVM, an allocated idle block from the feature set is not considered again.

In a process of executing the embodiment shown in FIG. 3, the method in this embodiment of the present disclosure may further include obtaining an image feature of the recycled invalid data block when the invalid data block in the storage space of the NVM is recycled, and updating the feature set of the storage space of the NVM according to the image feature of the recycled invalid data block. The invalid data block is a data block in which stored data is in an invalid state in the storage space of the NVM.

A condition for recycling the invalid data block in the storage space of the NVM may include that a preset time comes, and that a quantity of invalid data blocks reaches a preset value. The preset time and/or the preset value may be set according to an actual requirement, which is not limited in the present disclosure. A manner for creating the feature set of the storage space in this embodiment is the same as that of the foregoing embodiment, which is not described herein again.

Figure 6:
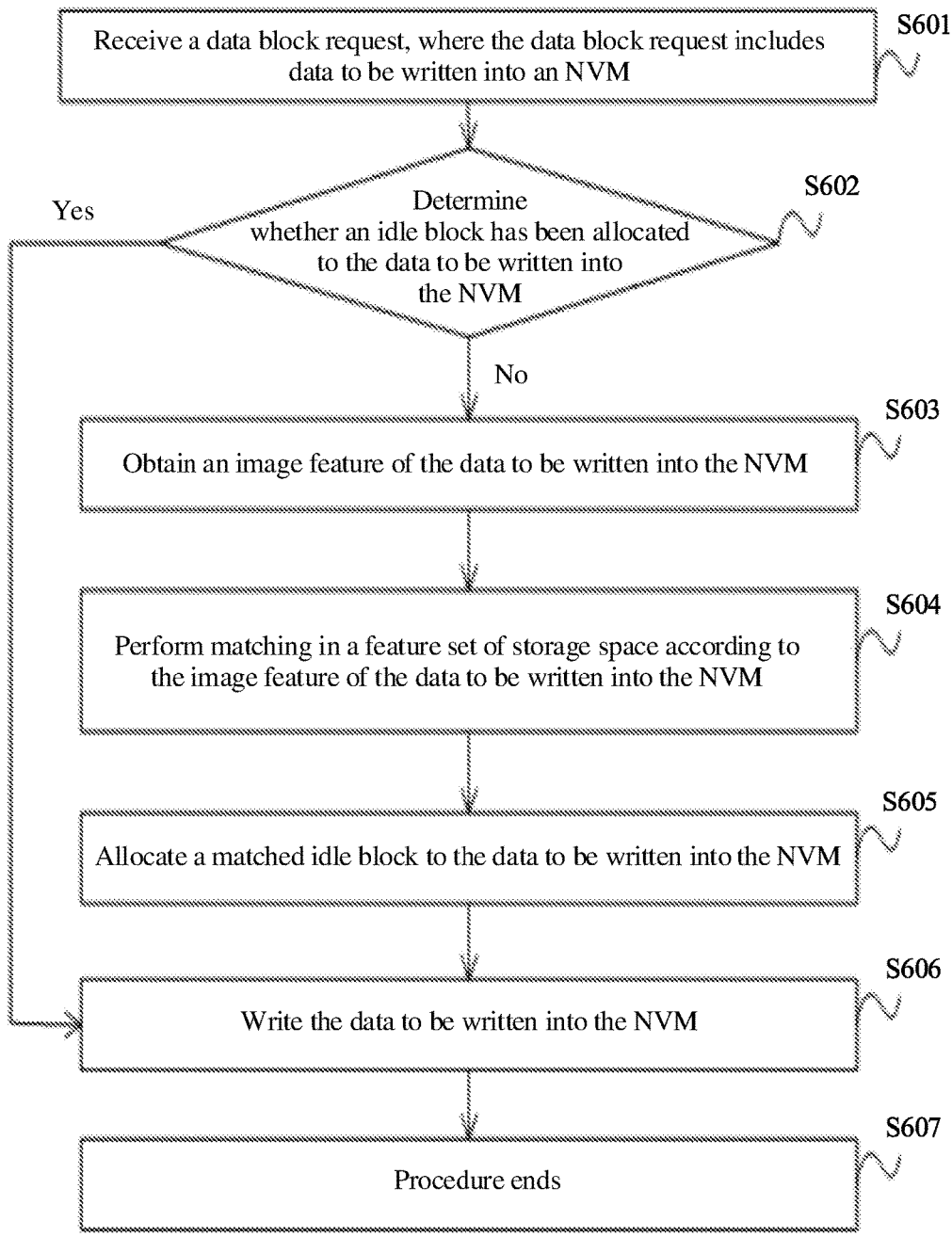
FIG. 6 is a schematic flowchart of still another storage space management method according to an embodiment of the present disclosure.

For example, FIG. 6 is a schematic flowchart of still another storage space management method according to an embodiment of the present disclosure. As shown in FIG. 6, an idle block is allocated, and the method includes the following steps.

Step S601: Receive a data block request, where the data block request includes data to be written into an NVM.

Step S602: Determine whether an idle block has been allocated to the data to be written into the NVM.

Perform step S606 if the idle block has been allocated to the data to be written into the NVM, and the data for the NVM is written into the allocated idle block. Perform step S603 if idle block has not been allocated to the data to be written into the NVM.

Step S603: Obtain an image feature of the data to be written into the NVM.

Step S604: Perform matching in a feature set of storage space according to the image feature of the data to be written into the NVM.

In this step S604, an idle block whose image feature is highly similar to the image feature of the data to be written into the NVM is matched.

Step S605: Allocate the matched idle block to the data to be written into the NVM.

Step S606: Write the data to be written into the NVM.

Step S607: Procedure ends.

Figure 7:
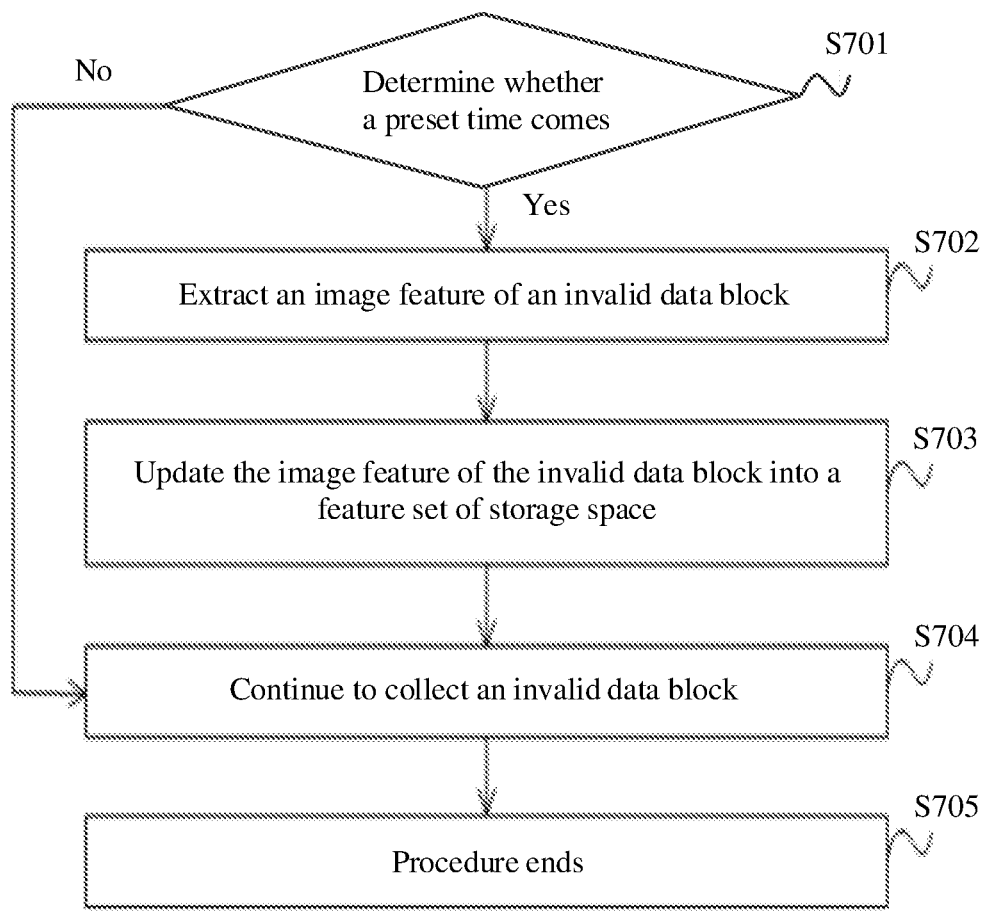
FIG. 7 is a schematic flowchart of Embodiment 4 of yet another storage space management method according to an embodiment of the present disclosure.

FIG. 7 is a schematic flowchart of yet another storage space management method according to an embodiment of the present disclosure. As shown in FIG. 7, an invalid data block is recycled, and the method includes the following steps.

Step S701: Determine whether a preset time comes.

Alternatively, this step S701 may be determining whether a quantity of invalid data blocks reaches a preset value.

Perform step S702 if the quantity of invalid data blocks reaches the preset value, and perform step S704 if the quantity of invalid data blocks does not reach the preset value.

Step S702: Extract an image feature of an invalid data block.

The extraction step is the same as the step S301, and details are not described herein again.

Step S703: Update the image feature of the invalid data block into a feature set of storage space.

Step S704: Continue to collect an invalid data block.

Step S705: Procedure ends.

Because a preset condition needs to be met to recycle the invalid data block, and the feature set is updated according to the recycled invalid data block, the feature set is not frequently updated, and storage performance of an NVM can be ensured.

Figure 8:
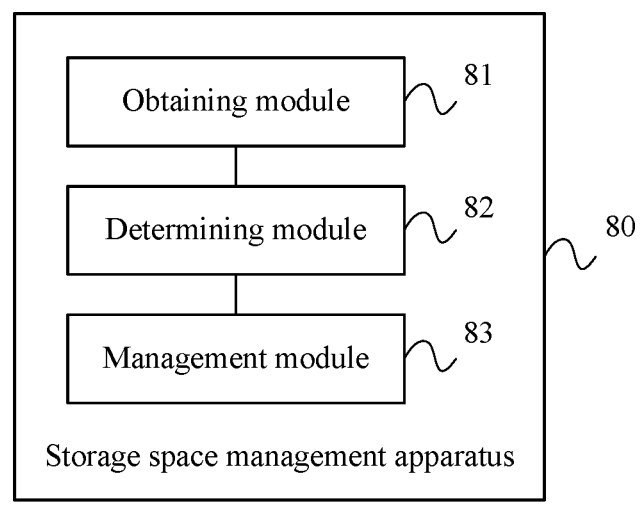
FIG. 8 is a schematic structural diagram of a storage space management apparatus according to an embodiment of the present disclosure.

FIG. 8 is a schematic structural diagram of a storage space management apparatus 80 according to an embodiment of the present disclosure. This embodiment of the present disclosure provides a storage space management apparatus, and the apparatus is applied to an NVM. As shown in FIG. 8, a storage space management apparatus 80 includes an obtaining module 81, a determining module 82, and a management module 83.

The obtaining module 81 is configured to obtain an image feature of data to be written into the NVM. The determining module 82 is configured to determine, in a feature set of storage space of the NVM, a first image feature that is most similar to the image feature, obtained by the obtaining module 81, of the data, where M image features obtained according to M idle blocks in the storage space of the NVM are included in the feature set, a size of each idle block in the storage space is the same as a size of the data, the M idle blocks include an invalid data block and an area in which no data is written in the storage space of the NVM, and M is a natural number. The management module 83 is configured to write the data into an idle block having the first image feature determined by the determining module 82.

The storage space management apparatus 80 in this embodiment may be configured to execute the technical solution in the method embodiment shown in FIG. 3. Implementation principles and technical effects of the storage space management apparatus 80 and the method are similar, and details are not described herein again.

In the foregoing embodiment, the obtaining module 81 may be further configured to calculate an image feature of each of the M idle blocks in the storage space of the NVM.

That the obtaining module 81 is configured to calculate an image feature of each of the M idle blocks in the storage space of the NVM may further include traversing an idle block i in the storage space of the NVM using a preset window, and obtaining an LBP eigenvector $X_i$ of the idle block i, where $X_i=\text{LBP}_{i1}, \text{LBP}_{i2}, \ldots, \text{LBP}_{iN}$), N is determined according to a size of the idle block i and a size of the preset window, $\text{LBP}_{in}$ is an LBP operator corresponding to each preset window in the idle block i, $$\text{LBP}_{in} = \sum_{j=0}^{J-1} s_j 2^j,$$

J indicates a total quantity of bits obtained after the LBP operator is converted into binary, and $s_j=0$ or 1, and obtaining an image feature $T_i$ of the idle block i according to the LBP eigenvector $X_i$ of the idle block i and a ratio $P_i$ of 0 to 1 in the idle block i, where $T_i=\alpha X_i+\beta P_i$, $\alpha$ and $\beta$ indicate weights, and $\alpha\beta=1$.

That the obtaining module 81 is configured to obtain an image feature of data to be written into the NVM may further include traversing the data using the preset window, obtaining an LBP eigenvector X of the data, where $X=(\text{LBP}_1, \text{LBP}_2, \ldots, \text{LBP}_N)$ and $$\text{LBP}_n = \sum_{j=0}^{J-1} s_j 2^j,$$

and obtaining an image feature T of the data according to the LBP eigenvector X of the data and a ratio P of 0 to 1 in the data, where $T=\alpha X+\beta P$.

Further, the feature set may include multiple B+ trees, and nodes of the multiple B+ trees include the M image features of the M idle blocks in the storage space of the NVM. The determining module 82 may further configured to determine a first B+ tree according to an Euclidean distance from the image feature of the data to a root node of each B+ tree in the multiple B+ trees, where the first B+ tree is a B+ tree with a shortest Euclidean distance in the Euclidean distances from the root node of each of all the B+ trees to the image feature of the data, calculate an Euclidean distance between the image feature of the data and each node in the first B+ tree, and determine that a first image feature with a shortest Euclidean distance to the image feature of the data is the first image feature that is most similar to the image feature of the data.

Based on the foregoing description, the management module 83 may be further configured to mark a status of the idle block having the first image feature as 'used' after the data is written into the idle block having the first image feature.

The management module 83 may be further configured to recycle the invalid data block in the storage space of the NVM. The obtaining module 81 may be further configured to obtain an image feature of the recycled invalid data block when the management module 83 recycles the invalid data block in the storage space of the NVM, where the invalid data block is a data block in which stored data is in an invalid state in the storage space of the NVM, and update the feature set of the storage space of the NVM according to the image feature of the invalid data block.

Figure 9:
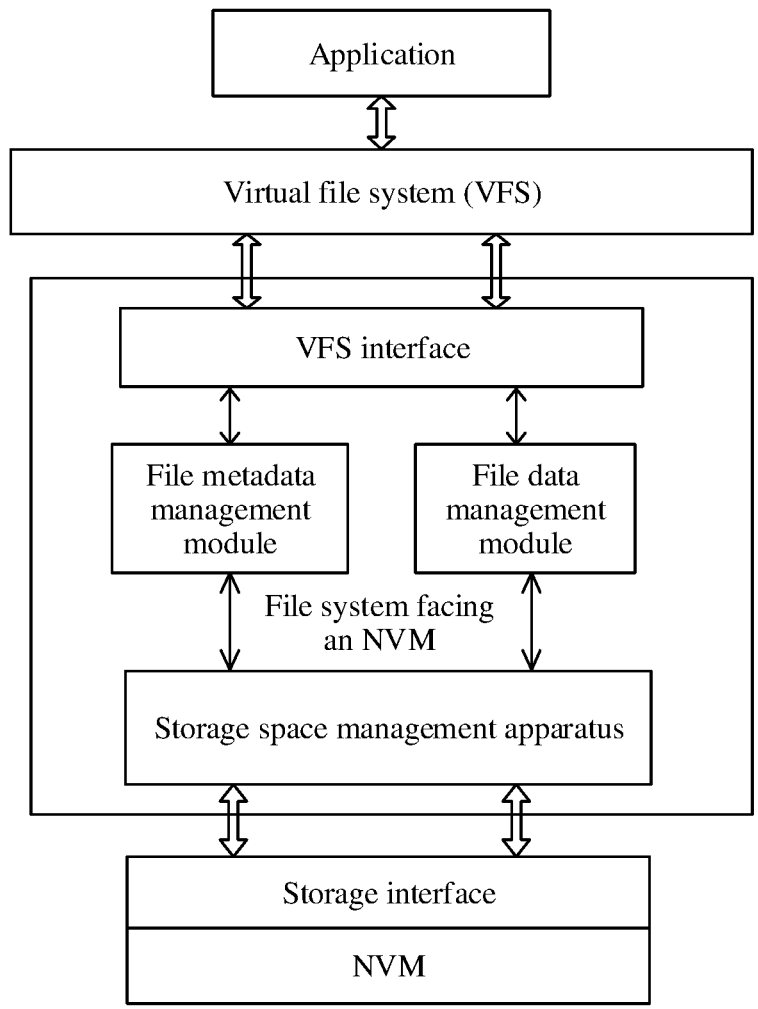
FIG. 9 is an exemplary diagram of still another application scenario according to an embodiment of the present disclosure.

For ease of understanding, FIG. 9 shows a complete illustration of data flow directions between an application, a virtual file system (VFS), a file system facing an NVM, and the NVM in a solution of an embodiment of the present disclosure. Arrows represent the data flow directions.

A storage space management apparatus is similar to the storage space management apparatus 80 shown in FIG. 8. The file system facing the NVM provides a portable operating system interface (POSIX) such as a VFS interface, which is not limited in this embodiment of the present disclosure. Regardless of whether there is a POSIX interface, this embodiment of the present disclosure is applicable. In addition, FIG. 9 is schematic logical diagram of a storage interface and the NVM. For a specific hardware example, refer to the hardware scenarios of the embodiments shown in FIG. 1 or FIG. 2.

Figure 10:
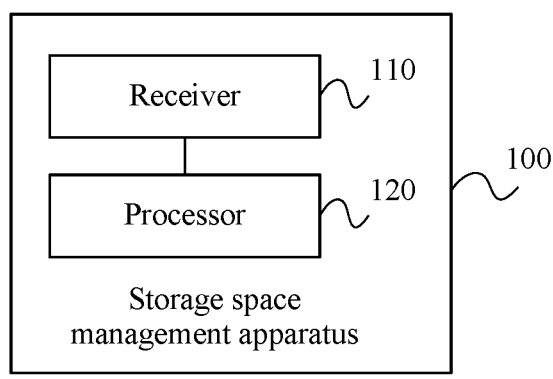
FIG. 10 is a schematic structural diagram of another storage space management apparatus according to an embodiment of the present disclosure.

FIG. 10 is a schematic structural diagram of another storage space management apparatus according to an embodiment of the present disclosure. This embodiment of the present disclosure provides a storage space management apparatus, and the apparatus is applied to an NVM. As shown in FIG. 10, a storage space management apparatus 100 includes a receiver 110 and a processor 120.

The receiver 110 is configured to receive data to be written into the NVM. The processor 120 is configured to obtain an image feature of the data that is to be written into the NVM and that is received by the receiver 110, determine, in a feature set of storage space of the NVM, a first image feature that is most similar to the image feature of the data, where M image features obtained according to M idle blocks in the storage space of the NVM are included in the feature set, a size of each idle block in the storage space is the same as a size of the data, the idle blocks include an invalid data block and an area in which no data is written in the storage space of the NVM, M is a quantity of idle blocks in the storage space of the NVM, and M is a natural number, and write the data into an idle block having the first image feature.

The storage space management apparatus 100 in this embodiment may be configured to execute the technical solution in the method embodiment shown in FIG. 3. Implementation principles and technical effects of the storage space management apparatus 100 and the method are similar, and details are not described herein again.

In the foregoing embodiment, the processor 120 may be further configured to calculate an image feature of each of the M idle blocks in the storage space of the NVM.

That the processor 120 is configured to calculate an image feature of each of the M idle blocks in the storage space of the NVM may further include traversing an idle block i in the storage space of the NVM using a preset window, and obtaining an LBP eigenvector $X_i$ of the idle block i, where $X_i=(LBP_{i1}, LBP_{i2}, \ldots, LBP_{iN})$, N is determined according to a size of the idle block i and a size of the preset window, $LBP_{in}$ is an LBP operator corresponding to each preset window in the idle block i, $$LBP_{in} = \sum_{j=0}^{J-1} s_j 2^j,$$

J indicates a total quantity of bits obtained after the LBP operator is converted into binary, and $s_j=0$ or 1, and obtaining an image feature $T_i$ of the idle block i according to the LBP eigenvector $X_i$ of the idle block i and a ratio $P_i$ of 0 to 1 in the idle block i, where $T_i=\alpha X_i+\beta P_i$, $\alpha$ and $\beta$ indicate weights, and $\alpha+\beta=1$.

That the processor 120 is configured to obtain an image feature of the data to be written into the NVM may further include traversing the data using the preset window, obtaining an LBP eigenvector X of the data, where $X=(LBP_1, LBP_2, \ldots, LBP_N)$, and $$LBP_n = \sum_{j=0}^{J-1} s_j 2^j,$$

and obtaining an image feature T of the data according to the LBP eigenvector X of the data and a ratio P of 0 to 1 in the data, where $T=\alpha X+\beta P$.

Further, the feature set may include multiple B+ trees, and nodes of the multiple B+ trees include the M image features of the idle blocks in the storage space of the NVM. That the processor 120 is configured to determine, in a feature set of storage space of the NVM, a first image feature that is most similar to the image feature of the data may further include determining a first B+ tree according to an Euclidean distance from the image feature of the data to a root node of each B+ tree in the multiple B+ trees, where the first B+ tree is a B+ tree with a shortest Euclidean distance in the Euclidean distances from the root node of each of all the B+ trees to the image feature of the data, calculating an Euclidean distance between the image feature of the data and each node in the first B+ tree, and determining that a first image feature with a shortest Euclidean distance that is in the Euclidean distances between the image feature of the data and all nodes in the first B+ tree is the first image feature that is most similar to the image feature of the data.

Based on the foregoing description, the processor 120 may be further configured to mark a status of the idle block having the first image feature as 'used' after the data is written into the idle block having the first image feature.

The processor 120 may be further configured to recycle the invalid data block in the storage space of the NVM, obtain an image feature of the recycled invalid data block, where the invalid data block is a data block in which stored data is in an invalid state in the storage space of the NVM, and update the feature set of the storage space of the NVM according to the image feature of the invalid data block.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

It should be noted that the embodiments provided in this application are merely exemplary. A person skilled in the art may clearly know that, for convenience and conciseness of description, in the foregoing embodiments, the embodiments emphasize different aspects, and for a part not described in detail in one embodiment, reference may be made to relevant description of another embodiment. The embodiments of the present disclosure, claims, and features disclosed in the accompanying drawings may exist independently, or exist in a combination. Features described in a hardware form in the embodiments of the present disclosure may be executed by software, and vice versa, which is not limited herein.

What is claimed is:

1. A storage space management method for a non-volatile memory (NVM), comprising:

obtaining an image feature of data to be written into the NVM;

calculating an image feature of each idle block of M idle blocks in a storage space of the NVM, M being a natural number, by:

traversing an idle block i in the storage space of the NVM using a preset window;

obtaining a local binary pattern (LBP) eigenvector of the idle block i $(X_i)$, the $X_i=(LBP_{i1}, LBP_{i2}, \ldots, LBP_{iN})$, the N being determined according to a size of the idle block i and a size of the preset window, the $LBP_{in}$, being an LBP operator corresponding to each preset window in the idle block i, the $$LBP_{in} = \sum_{j=0}^{J-1} s_j 2^j$$

the J indicating a total quantity of bits obtained after the LBP operator is converted into binary, and the $s_j=0$ or 1; and obtaining an image feature of the idle block i ($T_i$) according to the idle block $X_i$ and a ratio of 0 to 1 in the idle block i ($P_i$), the $T_i=\alpha X_i+\beta P_i$, the $\alpha$ and the $\beta$ being weights, and $\alpha+\beta=1$; and identifying a first image feature that is most similar to the image feature of the data in a feature set of storage space of the NVM, M image features obtained according to the M idle blocks in the storage space of the NVM being comprised in the feature set, and a size of the each idle block in the storage space being equivalent to a size of the data; and writing the data into an idle block having the first image feature.

2. The storage space management method of claim 1, wherein obtaining the image feature of the data to be written into the NVM comprises:

traversing the data using the preset window;

obtaining an LBP eigenvector of the data (X), the $X=(LBP_1, LBP_2, \ldots, LBP_N)$, the $$LBP_n = \sum_{j=0}^{J-1} s_j 2^j;$$

and obtaining the image feature of the data (T) according to the X and a ratio of 0 to 1 in data (P), the $T=\alpha X+\beta P$.

3. The storage space management method of claim 2, wherein the feature set comprises a plurality of B+ trees, nodes of the B+ trees comprising the M image features of the M idle blocks in the storage space of the NVM, identifying the first image feature that is most similar to the image feature of the data comprising:

identifying a first B+ tree according to an Euclidean distance from the image feature of the data to a root node of each B+ tree in B+ trees, the first B+ tree being a B+ tree with a shortest Euclidean distance in Euclidean distances from the root node of each of all the B+ trees to the image feature of the data;

calculating an Euclidean distance between the image feature of the data and each node in the first B+ tree; and identifying that a first image feature with a shortest Euclidean distance in the Euclidean distances between the image feature of the data and all nodes in the first B+ tree is the first image feature that is most similar to the image feature of the data.

4. The storage space management method of claim 1, further comprising marking a status of the idle block having the first image feature as 'used'.

5. The storage space management method of claim 1, further comprising:

obtaining an image feature of a recycled invalid data block when the invalid data block in the storage space of the NVM is recycled, the invalid data block being a data block in which stored data is in an invalid state in the storage space of the NVM; and updating the feature set of the storage space of the NVM according to the image feature of the recycled invalid data block.

6. A storage space management apparatus, comprising:

a receiver configured to receive data to be written into a non-volatile memory (NVM);

a processor coupled to the receiver and configured to:

obtain an image feature of the data to be written into the NVM;

calculate an image feature of each idle block of M idle blocks in a storage space of the NVM, M being a natural number, by being configured to:

traverse an idle block i in the storage space of the NVM using a preset window;

obtain a local binary pattern (LBP) eigenvector of the idle block i ($X_i$), the $X_i=(LBP_{i1}, LBP_{i2}, \ldots, LBP_{iN})$, the N being determined according to a size of the idle block i and a size of the preset window, $LBP_{in}$ being an LBP operator corresponding to each preset window in the idle block i, the $$LBP_{in} = \sum_{j=0}^{J-1} s_j 2^j,$$

the J indicating a total quantity of bits obtained after the LBP operator is converted into binary, and the $s_j=0$ or 1; and obtain an image feature of the idle block i ($T_i$) according to the idle block $X_i$, and a ratio of 0 to 1 in the idle block i ($P_i$), the $T_i=\alpha X_i+\beta P_i$, the $\alpha$ and the $\beta$ being weights, and $\alpha+\beta=1$; and identify a first image feature that is most similar to the image feature of the data in a feature set of storage space of the NVM, M image features obtained according to the M idle blocks in the storage space of the NVM being comprised in the feature set, a size of the each idle block in the storage space being equivalent to a size of the data; and write the data into an idle block having the first image feature.

7. The storage space management apparatus of claim 6, wherein the processor is further configured to:

traverse the data using the preset window;

obtain an LBP eigenvector of the data (X), the $X=(LBP_1, LBP_2, \ldots, LBP_N)$, the $$LBP_n = \sum_{j=0}^{J-1} s_j 2^j;$$

and obtain an image feature of the data (T) according to the X and a ratio of 0 to 1 in the data (P), the $T=\alpha X+\beta P$.

8. The storage space management apparatus of claim 7, wherein the feature set comprises a plurality of B+ trees, nodes of the B+ trees comprising the M image features of the M idle blocks in the storage space of the NVM, the processor being further configured to:

identify a first B+ tree according to an Euclidean distance from the image feature of the data to a root node of each B+ tree in the B+ trees, and the first B+ tree being a B+ tree with a shortest Euclidean distance in Euclidean distances from the root node of each of all the B+ trees to the image feature of the data;

calculate an Euclidean distance between the image feature of the data and each node in the first B+ tree; and identify that a first image feature with a shortest Euclidean distance in the Euclidean distances between the image feature of the data and all nodes in the first B+ tree is the first image feature that is most similar to the image feature of the data.

9. The storage space management apparatus of claim 6, wherein the processor is further configured to mark a status of the idle block having the first image feature as 'used' after the data is written into the idle block having the first image feature.

10. The storage space management apparatus of claim 6, wherein the processor is further configured to:

obtain an image feature of a recycled invalid data block when the invalid data block in the storage space of the NVM is recycled, and the invalid data block being a data block in which stored data is in an invalid state in the storage space of the NVM; and update the feature set of the storage space of the NVM according to the image feature of the recycled invalid data block.

11. The storage space management method of claim 1, wherein the M idle blocks comprise an invalid data block and an area in which no data is written in the storage space of the NVM.

12. The storage space management method of claim 1, wherein the NVM comprises at least one of a phase change memory, a resistive random access memory, or a magnetic random access memory.

13. The storage space management apparatus of claim 6, wherein the M idle blocks comprise an invalid data block and an area in which no data is written in the storage space of the NVM.

14. The storage space management apparatus of claim 6, wherein the NVM comprises at least one of a phase change memory, a resistive random access memory, or a magnetic random access memory.

* * * * *

UNITED STATES PATENT AND TRADEMARK OFFICE
CERTIFICATE OF CORRECTION

PATENT NO. : 10,261,715 B2
APPLICATION NO. : 15/625385
DATED : April 16, 2019
INVENTOR(S) : Changliang Xue et al.

It is certified that error appears in the above-identified patent and that said Letters Patent is hereby corrected as shown below:

In the Claims

Column 14, Line 47: "$LBP_{,iN}$" should read "$LBP_{iN}$"

Column 14, Line 49: "$LBP_{in,}$" should read "$LBP_{in}$"

Column 14, Line 59: "$s_i = 0$" should read "$s_j = 0$"

Column 16, Line 14: "$s_i = 0$" should read "$s_j = 0$"

Signed and Sealed this
Ninth Day of July, 2019

Andrei Iancu
*Director of the United States Patent and Trademark Office*